United States Patent
Kang

(10) Patent No.: US 11,462,235 B2
(45) Date of Patent: Oct. 4, 2022

(54) SURVEILLANCE CAMERA SYSTEM FOR EXTRACTING SOUND OF SPECIFIC AREA FROM VISUALIZED OBJECT AND OPERATING METHOD THEREOF

(71) Applicant: HANWHA TECHWIN CO., LTD., Seongnam-si (KR)

(72) Inventor: Yongmin Kang, Seongnam-Si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 17/176,322

(22) Filed: Feb. 16, 2021

(65) Prior Publication Data
US 2021/0201933 A1  Jul. 1, 2021

Related U.S. Application Data

(63) Continuation of application No. PCT/KR2019/010094, filed on Aug. 9, 2019.

(30) Foreign Application Priority Data

Aug. 16, 2018 (KR) .................. 10-2018-0095425
Jul. 25, 2019 (KR) .................. 10-2019-0090302

(51) Int. Cl.
*H04R 29/00* (2006.01)
*G10L 25/57* (2013.01)
(Continued)

(52) U.S. Cl.
CPC ............. *G10L 25/57* (2013.01); *G10L 21/10* (2013.01); *G10L 25/78* (2013.01); *G10L 25/90* (2013.01);
(Continued)

(58) Field of Classification Search
CPC ..................................................... H04R 29/00
See application file for complete search history.

(56) References Cited

U.S. PATENT DOCUMENTS

2016/0100092 A1* 4/2016 Bohac .................. G06F 3/16
                                                                382/103
2016/0277863 A1* 9/2016 Cahill .................. G01S 3/801
(Continued)

FOREIGN PATENT DOCUMENTS

JP  2018-19263 A  2/2018
WO  2017/055348 A1  4/2017

OTHER PUBLICATIONS

International Search Report (PCT/ISA/210) dated Dec. 9, 2019 by the International Searching Authority in counterpart International Patent Application No. PCT/KR2019/010094.
(Continued)

*Primary Examiner* — Olisa Anwah
(74) *Attorney, Agent, or Firm* — Sughrue Mion, PLLC

(57) ABSTRACT

A camera system for extracting a sound of a specific area includes: a camera device configured to receive video signals and audio signals from an area; at least one memory configured to store information about the area including data corresponding to the video signals and the audio signals from the area; and a processor configured to change an audio zooming point of the camera device from a first point, in an image of the area captured by the camera device, to a second point based on the information about the area, and perform a beam-forming on an audio signal corresponding to the second point.

19 Claims, 11 Drawing Sheets

(51) Int. Cl.
    *G10L 21/10*     (2013.01)
    *G10L 25/78*     (2013.01)
    *G10L 25/90*     (2013.01)
    *H04N 5/76*     (2006.01)
    *H04N 7/18*     (2006.01)
    *H04R 1/40*     (2006.01)
    *H04R 3/00*     (2006.01)

(52) U.S. Cl.
    CPC ............... *H04N 5/76* (2013.01); *H04N 7/18* (2013.01); *H04R 1/406* (2013.01); *H04R 3/005* (2013.01)

(56) References Cited

U.S. PATENT DOCUMENTS

| | | | | |
|---|---|---|---|---|
| 2017/0019744 | A1* | 1/2017 | Matsumoto | G06V 10/147 |
| 2017/0133041 | A1* | 5/2017 | Mortensen | G10L 15/02 |
| 2017/0186291 | A1* | 6/2017 | Wenus | G01S 3/786 |
| 2017/0280108 | A1 | 9/2017 | Matsumoto et al. | |
| 2018/0025232 | A1* | 1/2018 | Eronen | G06F 3/14 |
| | | | | 382/103 |
| 2019/0019295 | A1* | 1/2019 | Lehtiniemi | H04R 5/027 |

OTHER PUBLICATIONS

Written Opinion (PCT/ISA/237) dated Dec. 9, 2019 by the International Searching Authority in counterpart International Patent Application No. PCT/KR2019/010094.

* cited by examiner

APPENDIX

SURVEILLANCE CAMERA SYSTEM FOR EXTRACTING SOUND OF SPECIFIC AREA FROM VISUALIZED OBJECT AND OPERATING METHOD THEREOF

CROSS-REFERENCE TO THE RELATED APPLICATION

This application is a continuation of International Patent Application No. PCT/KR2019/010094 filed on Aug. 9, 2019, and claims priority from Korean Patent Application No. 10-2018-0095425 filed on Aug. 16, 2018 and No. 10-2019-0090302 filed on Jul. 25, 2019, in the Korean Intellectual Property Office, and the disclosures of which in their entirety are incorporated herein by reference.

BACKGROUND

1. Field

Apparatuses and methods consistent with the embodiments relate to a camera system, and more specifically, to extracting sounds from a visualized object in a specific area by selecting an audio zooming point in a surveillance area image from a surveillance camera device, correcting the selected audio zooming point and selectively amplifying a voice signal at the corrected audio zooming point.

2. Description of the Related Art

Recently, the necessity for setting up surveillance camera systems in surveillance areas such as a specific area in a street, inside or outside a building, are increasing with the purpose of crime preventions, securities and store managements, etc.

A surveillance camera system can collect sounds and videos at the same time. However, there are many circumstances where the quality of the collected sound tends to be easily degraded due to influences of surrounding environments such as diffraction and refraction phenomena caused by various noise sources.

Additionally, there is a need for a camera system that functions to selectively detect or amplify audio signals of a sound generated from a specific position in a surveillance area being captured by a surveillance camera.

SUMMARY

Provided is a surveillance camera system which selectively amplifies audio signals from a specific position displayed in a video image of a surveillance area using a microphone array mounted on a surveillance camera device. In a circumstances where a camera and the microphone array are located in different planes or surfaces, the surveillance camera system extracts sounds from an object in a specific area by receiving video signals and audio signals using the camera and the microphone array and amplifying an audio signal corresponding to an audio zooming point in a user-designated area based on the video signals and the audio signals.

Also provided is a surveillance camera system which makes as a database various information corresponding to the surveillance area of the camera by storing video signals and audio signals input through the camera and the microphone array, and performs a precise audio zooming by correcting the audio zooming point with reference to the database when amplifying the audio signal of the audio zooming point displayed in the surveillance area video image.

However, aspects of the inventive concept are not restricted to those set forth herein. Various other aspects of the inventive concept will become more apparent to one of ordinary skill in the art to which the embodiments of the inventive concept pertain by referencing the detailed description of the embodiments given below.

According to an aspect of an embodiment, there is provided a camera system for extracting sounds of a specific area. The camera system may include: a camera device configured to receive video signals and audio signals from an area; at least one memory configured to store information about the area including data corresponding to the video signals and the audio signals from the area; and a processor configured to change an audio zooming point of the camera device from a first point, in an image of the area captured by the camera device, to a second point based on the information about the area, and perform a beam-forming on an audio signal corresponding to the second point.

The audio signal on which the beam-forming is performed may be limited to a human voice signal.

The processor may be further configured to determine the audio signal as the human voice signal based on determining that the audio signal includes a vowel among language components.

The processor may be configured to implement: a data collector configured to generate a sound-based heatmap for the area based on the information about the area; a user area selector configured to select a user-designated area to perform the beam-forming thereon, and select the first point in the user-designated area as the audio zooming point; a calculator configured to select the second point as the audio zooming point in the user-designated area, based on the first point and the sound-based heatmap; and a corrector configured to perform the beam-forming in a direction corresponding to the second point.

The sound-based heatmap may display positions of a pitch range corresponding to human voice signals by a sound source localization based on the video signals and the audio signals received by the camera device.

The surveillance area video may be split into a plurality of areas, and the user area selector is configured to select at least one of the plurality of areas as the user-designated area.

The user area selector may specify an object corresponding to a target of the beam-forming based on a motion detection algorithm and/or a face recognition algorithm.

Both the first and second points may be displayed on the image of the area.

The second point may be selected from a plurality of second points displayed by the camera device.

The surveillance camera device may include: a camera configured to collect the video signals having a specific viewing angle; and a microphone array including a plurality of microphones spaced apart from one another, and configured to collect the audio signals.

The camera and the microphone array are disposed on different surfaces of the camera device.

The memory may be further configured to manage data output from the calculator, and store a measurement time and a date corresponding the video signals and the audio signals received by the camera device together with the data output from the calculator.

According to another aspect of an embodiment, there is provided a method for operating a camera system for extracting a sound of a specific area. The method may include: receiving video signals and audio signals from an area; storing information about the area including the video signals and the audio signals; generating a sound-based heatmap for the area based on the information about the area; selecting a user-designated area to perform beam-forming thereon and selecting a first point in the user-designated area as an audio zooming point; changing the audio zooming point to a second point in the user-designated area based on the first point and the sound-based heatmap; and performing the beam-forming in a direction corresponding to the second point.

An audio signal on which the beam-forming may be performed is limited to a human voice signal.

The method may further include determining the audio signal as the human voice signal based on determining that the audio signal includes a vowel among language components.

The sound-based heatmap may display positions of a pitch range corresponding to human voice signals by a sound source localization based on the video signals and the audio signals.

The area may be split into a plurality of areas, and the selecting the user-designated area includes selecting at least one of the plurality of split areas as the user-designated area.

The selecting a user-designated area may further include specifying an object corresponding to a target of the beam-forming based on a motion detection algorithm and/or a face recognition algorithm.

Both the first and second audio zooming points may be displayed on an image of the area.

The second point may be selected from a plurality of second points displayed by a camera device.

BRIEF DESCRIPTION OF THE DRAWINGS

The above and other aspects and features of the disclosure will become more apparent by describing in detail embodiments thereof with reference to the attached drawings, in which.

DETAILED DESCRIPTION

Figure 1:
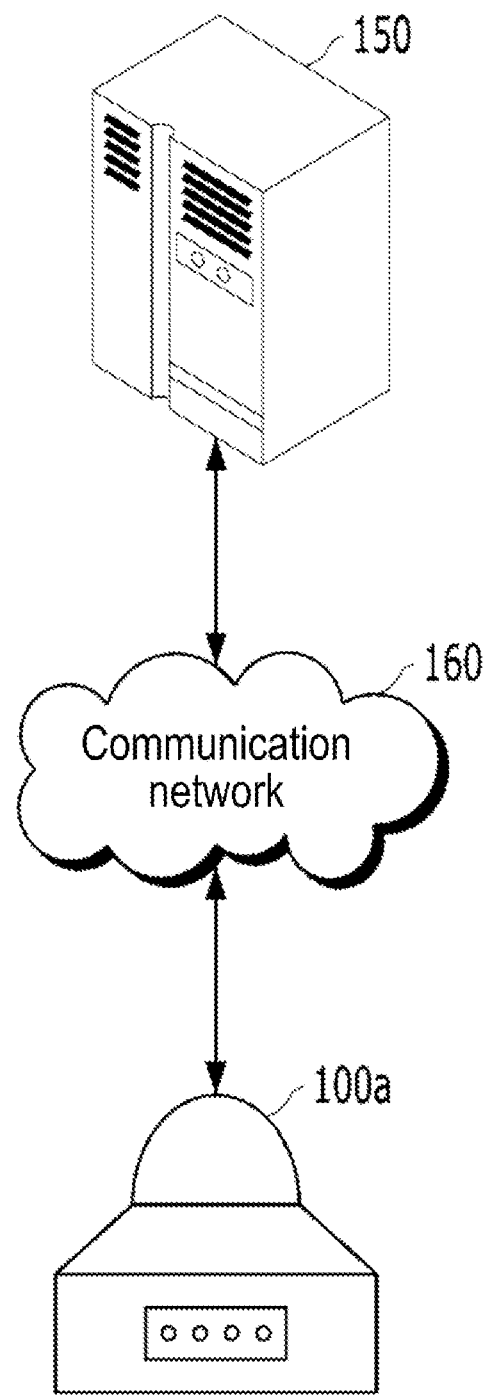
FIG. 1 is a block diagram which roughly illustrates a structure of a surveillance camera system according to an embodiment.

Benefits and features of the disclosure, and methods for accomplishing the same will become apparent with reference to embodiments described below in detail in conjunction with the accompanying drawings. However, the embodiments disclosed herein are all example embodiments, and thus, the disclosure is not limited to these embodiments, but may be implemented in various forms. The embodiments are merely provided to make the disclosure of this invention complete and to fully inform the scope of the disclosure to those ordinarily skilled in the art. The disclosure is defined only by the scope of claims. Like reference numerals refer to like elements throughout the specification.

Unless otherwise defined, all terms (including technical and scientific terms) used herein may be used in a sense that may be commonly understood by those of ordinary skill in the art. In addition, the terms defined in the commonly used dictionaries are not ideally or excessively interpreted unless they are specifically defined clearly.

The terms used herein are for the purpose of describing embodiments and are not intended to be limiting of the disclosure. Herein, the singular also includes the plural unless specifically stated otherwise in the phrase. The term "comprises" and/or "comprising" as used herein does not exclude the presence or addition of one or more other components in addition to the mentioned components. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, embodiments of the present disclosure will be described in detail with reference to the accompanying drawings.

Figure 2:
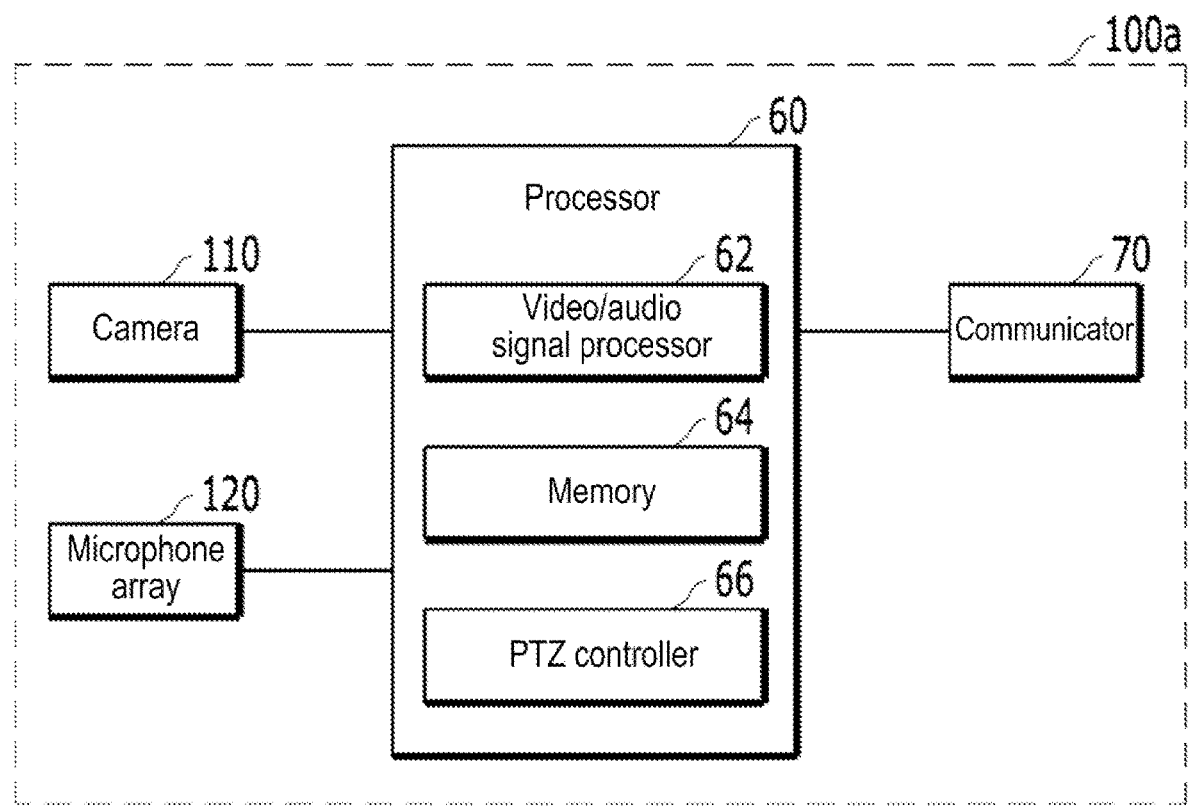
FIG. 2 is a block diagram which roughly illustrates a structure of a surveillance camera device according to an embodiment.
Figure 3:
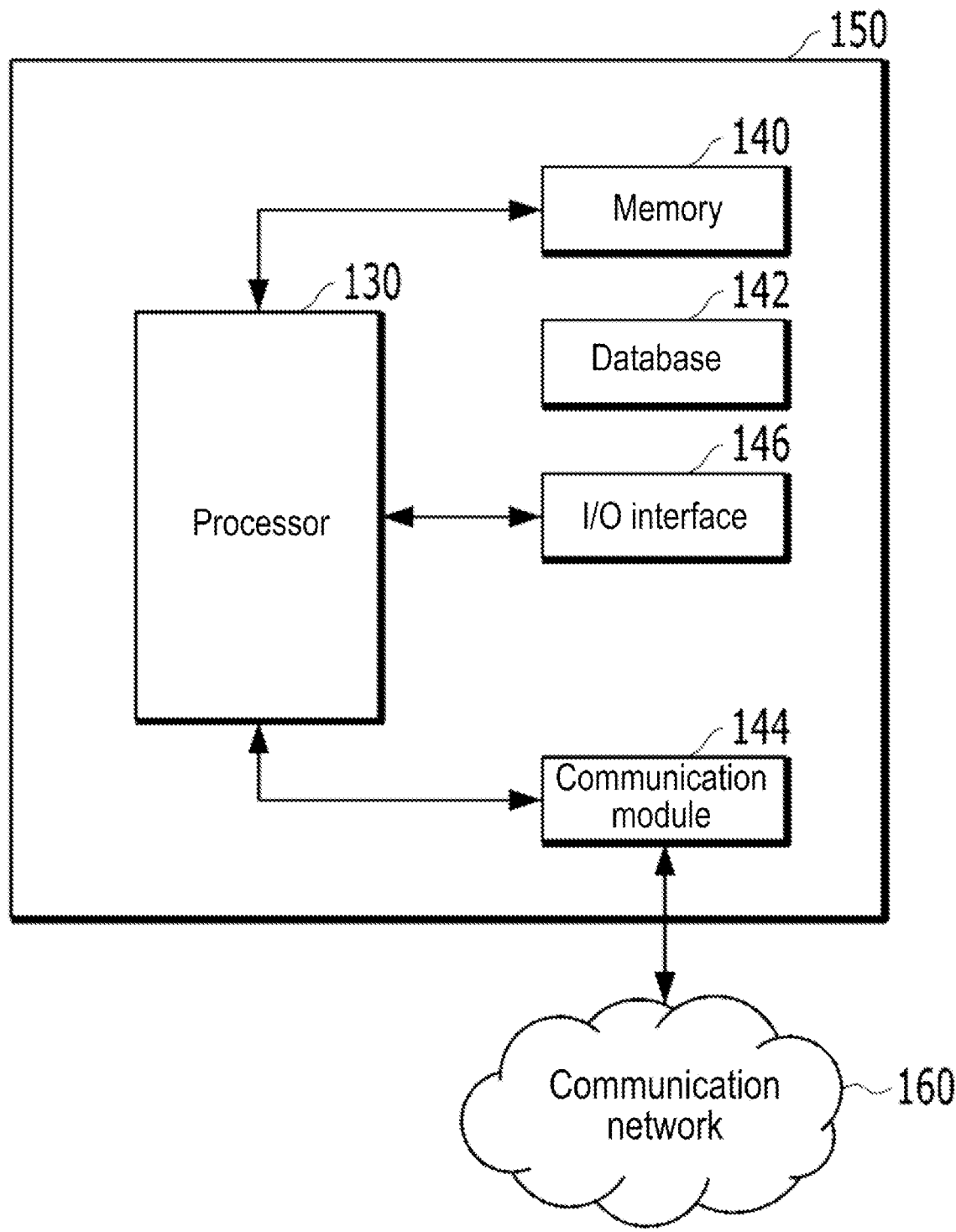
FIG. 3 is a block diagram which roughly illustrates a structure of a surveillance server according to an embodiment.

FIG. 1 is a block diagram which illustrates a structure of a surveillance camera system according to an embodiment, and FIG. 2 is another block diagram which illustrates a structure of a surveillance camera device according to an embodiment. Additionally, FIG. 3 is another block diagram which illustrates a structure of a surveillance server according to an embodiment.

In the embodiment of FIG. 1, a surveillance camera device 100*a* and a surveillance server 150 are separate from each other but connected to each other via an external communication network 160, but this is merely an embodiment and the scope of the inventive concept is not limited to it. For example, the surveillance camera device 100*a* and the surveillance server 150 may be integrated as a single device without the external communication network 160 to constitute together a surveillance camera device according to an embodiment.

Referring to FIG. 1, the surveillance camera system according to an embodiment may include at least one surveillance camera device such as the surveillance camera device 100*a*. The surveillance camera device 100*a* may be installed at a fixed position of a specific location to monitor a surveillance area of which an image is capturable by the surveillance camera device 100*a*, and perform an operation of continuously receiving information on events occurred in the surveillance area. For example, the surveillance camera device 100*a* may have functions to capture and record an image of the surveillance area using a PTZ camera having a pan, tilt, and/or zoom functions.

The surveillance server 150 may control the surveillance camera device 100*a* and a database which stores information received through the surveillance camera device 100*a* and various information corresponding to the surveillance area.

A communication network 160 may connect the surveillance camera device 100*a* and the surveillance server 150 for data transmission/reception therebetween.

The communication network 160, for example, may be implemented by a wired network such as Local Area Networks (LANs), Wide Area Networks (WANs), Metropolitan Area Networks (MANs), Integrated Service Digital Networks (ISDNs) or by a wireless network such as wireless LANs, CDMA, Bluetooth, a satellite communication, but is not limited to these examples. That is, as mentioned earlier, in case that the surveillance camera device 100*a* and the surveillance server 150 are integrated in a single device, the communication network 160 may be replaced with a communication module or component for transmitting/receiving data between other modules or components installed in the single device.

Referring to FIG. 2, the surveillance camera device 100*a* may include a camera 110, a microphone array 120, a processor 60 and a communicator 70.

The camera 110 captures images of the surveillance area to receive video signals thereof. For example, the camera 110 according to an embodiment may be implemented by a surveillance camera set up in a fixed position to capture images of a surveillance area for a predetermined time.

The microphone array 120 includes a plurality of microphones receiving audio input signals of sounds generated in the surveillance area.

The processor 60 controls overall operations of the camera 110 and the microphone array 120, and includes a video/audio signal processor 62, a memory 64 and a PTZ controller 66.

The video/audio signal processor 62 processes video and audio signals input in real time, and generates surveillance information. The surveillance information may include video information about the images captured by the camera 110 and audio information about the sounds received by the microphone array 120.

The memory 64 stores and manages video/audio information generated in the video/audio signal processor 62, camera-identification information (e.g., camera ID), camera position information, etc.

The PTZ controller 66 changes PTZ coordinates of the camera 110 according to preset information. The preset information may be input by an operator, for example, through the surveillance server 150, and the operator can control the position, the direction and the zoom scales of the camera 110 by changing the PTZ coordinates based on the preset information.

The processor 60 performs basic arithmetic, logics and input/output calculation and processes instructions of computer programs. The instructions are provided from the memory 64 to the processor 60. Here, the processor 60 may be configured to execute instructions according to codes of an operating system loaded in the memory 64 and at least one program code. In this regard, components in the processor 60, that is, the video/audio signal processor 62 and the PTZ controller 66 can be understood to refer to different functions or software modules performed according to control instructions provided by the program codes stored in the memory 64.

The communicator 70 may include a communication module and an antenna, accesses to the processor 60, and transmits to the surveillance server 150 information such as the video and/or audio information of the video/audio signal processor 62. The communication module may include any one or any combination of a digital modem, a radio frequency (RF) modem, a WiFi chip, and related software and/or firmware.

Referring to FIG. 3, the surveillance server 150 includes a memory 140, a database 142, a processor 130, a communication module 144 and an input/output interface 146.

The memory 140 may be a computer-readable medium including a non-volatile bulk storage such as a read-only memory (ROM) and a disk drive. Additionally, the memory 140 may load an operating system and at least one program code. These software components may be loaded from other computer-readable media separate from the memory 140 with the use of a drive mechanism. These separate computer-readable media may include a recording medium such as a floppy drive, a physical disk, a tape, a DVD/CD-ROM drive, a memory card. Additionally, the software components may be loaded on the memory 140 through the communication module 144.

The database 142 stores information generated by storing input signals such as video and/or audio signals received by the surveillance camera device 100*a* according to an embodiment, and various information (e.g., a position of an obstacle, an ambient temperature) corresponding to the surveillance area of the surveillance camera device 100*a*.

According to an embodiment, when a user wants to amplify audio signals of a specific area within a surveillance area by using the database 142, it is possible to perform a precise audio zooming by correcting a specific position, which is referred to as an audio zooming point, of the user-designated area. More specific operations of the surveillance camera system according to an embodiment will be described later.

The processor 130 performs basic arithmetic, logics and input/output calculation and processes instructions of computer programs. The instructions are provided from the memory 140 or the communication module 144 to the processor 130. For example, the processor 130 may be configured to execute instructions received from the programs stored in a recording device such as the memory 140. That is, the processor 130 may process program modules to execute various functions, implemented by programming languages such as C, C++, Java, Visual Basic and Visual C.

The communication module 144 provides functions enabling the surveillance camera device 100*a* and the surveillance server 150 to communicate with each other through the communication network 160. For example, control signals, instructions, contents and files, etc. provided under controls of the processor 130 in the surveillance server 150 can be transmitted to the surveillance camera device 100*a* via the communication module 144 and the communication network 160, and signals generated in the surveillance camera device 100a can be also transmitted in the opposite direction to the surveillance server 150 via the communication network 160. The communication module may include any one or any combination of a digital modem, a radio frequency (RF) modem, a WiFi chip, and related software and/or firmware.

The input/output interface 146 is configured to provide an interface between output devices such as keyboard, mouse, etc.

Figure 4:
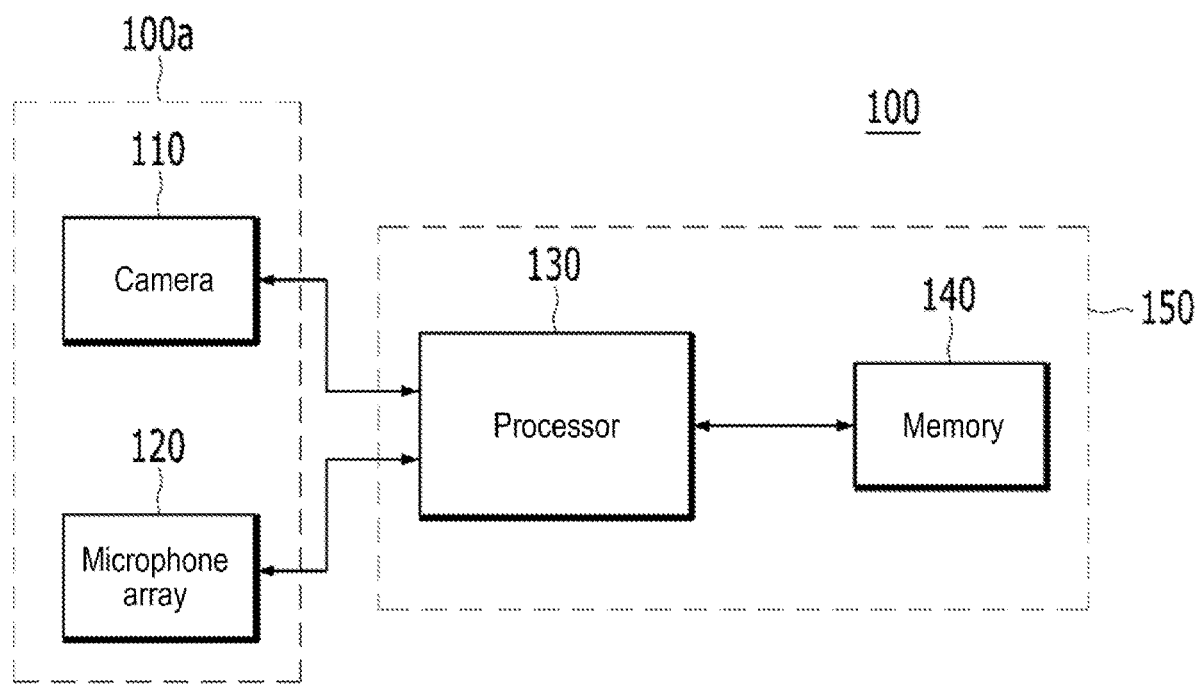
FIG. 4 is a block diagram which roughly illustrates operations between the surveillance camera device and the surveillance constituting together the surveillance camera system in FIG. 1.
Figure 5:
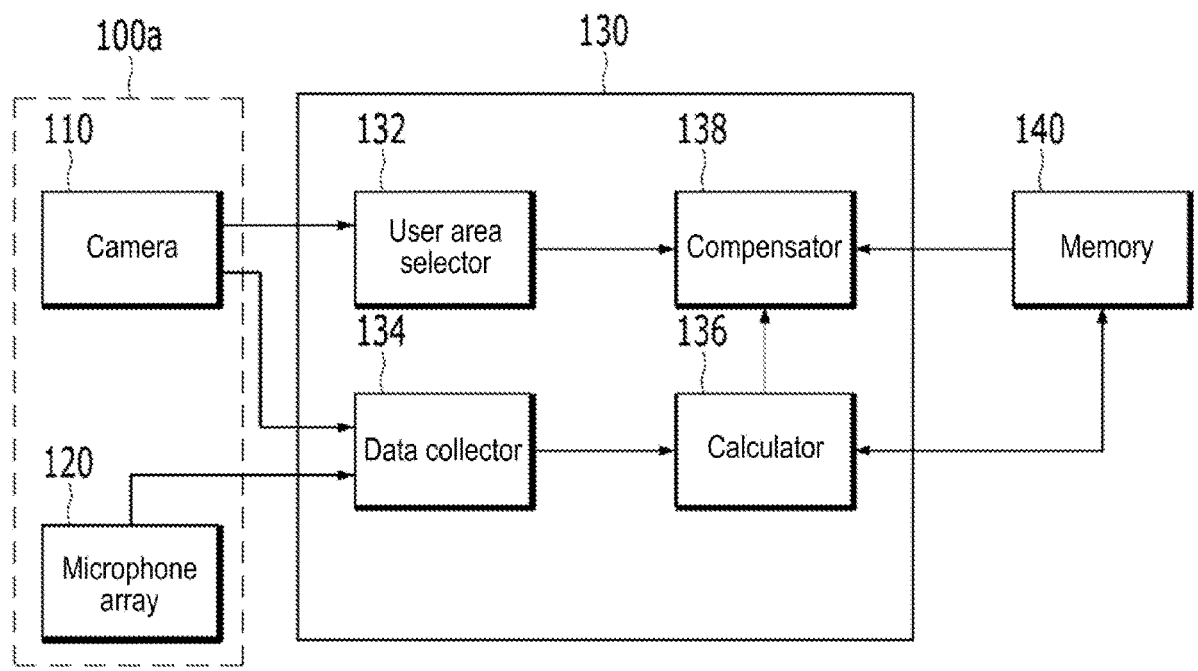
FIG. 5 is a block diagram which roughly illustrates a structure of the processor in FIG. 4.
Figure 6:
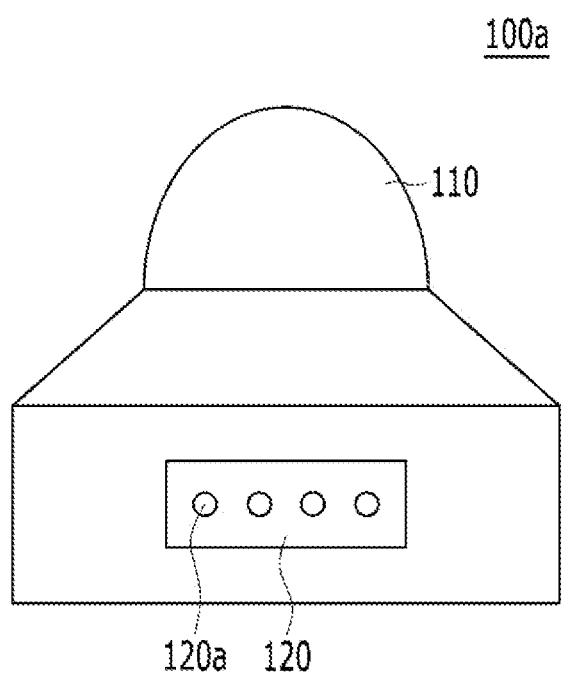
FIG. 6 is a drawing which roughly illustrates a side view of the surveillance camera device according to an embodiment.

FIG. 4 is a block diagram which illustrates operations between the surveillance camera device and the surveillance constituting together the surveillance camera system shown in FIG. 1, and FIG. 5 is another block diagram which illustrates a structure of the processor shown in FIG. 4. Additionally, FIG. 6 illustrates a side view of the surveillance camera device shown in FIG. 1 according to an embodiment.

Referring to FIGS. 4 and 5, a camera system 100 according to an embodiment includes a surveillance camera device 100a having a camera 110 and a microphone array 120, and a surveillance server 150 having a processor 130 and a memory 140. In addition, the processor 130 includes a user area selector 132, a data collector 134, a calculator 136, and a compensator 138.

The camera 110 captures images from the surveillance area of the surveillance camera device 100a. Although not shown in the drawing, the camera 110 may include a lens, an image sensor for converting a light signal input through the lens into an electric signal, an analog/digital (A/D) converter for converting the electrical signal output from the image sensor into a digital signal, an image signal processor for adjusting a visual quality and synthesizing a luminance signal and a chrominance signal based on a specific video standard to output a compressed video, and a codec/transmitter for transmitting the compressed video.

For example, the camera 110 according to an embodiment may be implemented by a surveillance camera. The surveillance camera is generally set up in a fixed position and performs an operation of capturing images of a surveillance area for a predetermined time.

A viewing angle of the camera 110 refers to an angle viewable to a user from the center of an image to edges of the image. Generally, a horizontal viewing angle and a vertical viewing angle can be used on the basis of the center of a typical lens, but other types of the viewing angles (e.g., diagonal angles of viewing) can be used for a fisheye lens. The camera according to an embodiment is not limited to the type of the viewing angles.

The microphone array 120 may be implemented by a plurality of microphones 120a as shown in FIG. 6, each of which is spaced apart from one another, and receives audio input signals. The plurality of microphones 120a may be arranged in at least one form including, but not limited to, a straight-line form, a plane form, a spherical surface form, and a helical form. The plurality of microphones 120a may be symmetrically or asymmetrically arranged. The microphones 120a constituting the microphone array 120 may be, but not limited to, a directional microphone.

Referring to an embodiment illustrated in FIG. 6, the microphone array 120 includes four microphones 120a linearly arranged, but it may include fewer or more than four microphones 120a. Additionally, the linear arrangement of microphones 120a is only an example, and it is also possible to adopt other arrangements that are not linear.

According to an embodiment, the microphone array 120 and the camera 110 may be disposed on different surfaces or planes (collectively, "surfaces"). Referring to FIG. 6, the camera 110, for example, a dome-shaped camera or its lens, is disposed at a front surface of the surveillance camera device 100a to be directed to an upper direction, while the microphone array 120 including the four microphones 120a is disposed at a side surface, that is, a circumferential body, of the surveillance camera device 100a to be directed to a front direction. However, it is merely an example, and thus, any other arrangements where the microphone array 120 and the camera 110 are disposed on different surfaces may be included in the inventive concept.

For precise audio zooming, the camera 110 and the microphone array 120 may be disposed on a same surface of the surveillance camera device 100a. However, it is difficult to dispose the camera 110, which is a dome-shaped camera, and the microphone array 120 at the same surface in the surveillance camera device 100a as shown in FIG. 6, whereby the camera 110 and the microphone array 120 may be directed to different directions. According to an embodiment, however, it may be possible to address this directional difference by compensating the difference between a direction vector of the microphone array 120 and a direction vector the camera 110a even when the microphone array 120 and the camera 110 are disposed on the different surfaces of the surveillance camera device 100a, as shown in FIG. 6.

It is possible to perform a beam-forming on the microphone array 120 having such an arrangement of a plurality of microphones. The beam-forming can be used to apply directivity when receiving sounds or audio signals, and implemented by a hardware beam-forming and/or a software beam-forming. For example, the software beam-forming may include a Delay-sum scheme, a Filter-sum scheme, a Super directive scheme, etc. The Delay-sum beam-forming is generally used for the software beam-forming. The Delay-sum beam-forming is a scheme to adjust delay times of sounds received from the microphones.

According to an embodiment, the camera 110 and the microphone array 120 are disposed on different surfaces of the camera system 100. The camera 110 may select, as an audio zooming point, a specific position of an image corresponding to a surveillance area captured by the camera 100, and amplify a sound or audio signal (collectively "audio signal") of the selected position. Additionally, in order to amplify the audio signal of the selected position, the processor 130 may be configured to receive video signals and/or audio signals from the camera 110 and the microphone array 120, respectively, and amplify the audio signal of the audio zooming point designated by the user based on the received video and/or audio signals.

According to an embodiment, in order to amplify the audio signal of the specific position (audio zooming point) in the surveillance area, the user may limit the target of the beam-forming to a human's voice and correct the position of the audio zooming point to receive the human's voice more precisely.

The processor 130 may be configured to detect a direction of the user-designated area through the viewing angle of the camera 110, and obtain a delay time corresponding to each microphone 120a of the microphone array 120 by obtaining an angle between the detected direction and each microphone 120a or the microphone array 120.

To this end, as illustrated in FIG. 5, the processor 130 may include a user area selector 132, a data collector 134, a calculator 136, and a compensator 138. The user area selector 132 may select a user-designated area as an audio zooming area that is a target of beam-forming. The data collector 134 may generate a sound-based heatmap based on signal data input from the camera 110 and the microphone array 120. The calculator 136 may obtain an optimal point for the audio zooming point in the area designated by the user area selector 132, based on information related to the audio zooming point in a two dimensional image through a viewing angle of the camera 110, that is, the viewing angle of the camera lens, and information related to the audio zooming point output by the data collector 134. The compensator 138 may perform an operation to modify the direction of the optimal point obtained by the calculator 136 into the standard direction of the microphone array 120.

The processor 130 performs basic arithmetic, logics and input/output calculation and processes instructions of computer programs. The instructions are provided from the memory 14 to the processor 130. For example, the processor 130 may be configured to execute instructions received from the programs stored in a recording device such as the memory 140.

The processor 130 may be configured to execute instructions according to codes of an operating system loaded in the memory 140 and at least one program codes. To this end, the components in the processor 130, that is, the user area selector 132, the data collector 134, the calculator 136, and the compensator 138 may be understood to refer to different software modules or functions performed by the processor 130 according to control instructions provided by the program codes stored in the memory 140.

The memory 140 may be a computer-readable medium including a non-volatile bulk storage such as a ROM and a disk drive. Additionally, the memory 140 may load an operating system and at least one program code. These software components may be loaded from other computer-readable media separate from the memory 140 with the use of a drive mechanism. These separate computer-readable media may include a recording medium such as a floppy drive, a physical disk, a tape, a DVD/CD-ROM drive, a memory card. Additionally, the software components may be loaded on the memory 140 through the communication module 144 (not shown).

Additionally, the memory 140 may be configured to store and manage the data output from the calculator 136. Distortion of a sound may be caused according to a specific time and date. For example, the propagating velocity of a sound is variable due to a temperature difference between summer and winter because density of air, which is a transmission medium of a sound, is changed easily. Thus, the memory 140 may store an output of the calculator 136 together with various data (e.g., a measurement time, a date, etc.) corresponding to the signal or data input from the camera 110 and the microphone array 120.

Hereinafter, operations and/or functions of each component of the processor 130 illustrated in FIG. 5 will be described in more detail.

Figure 7:
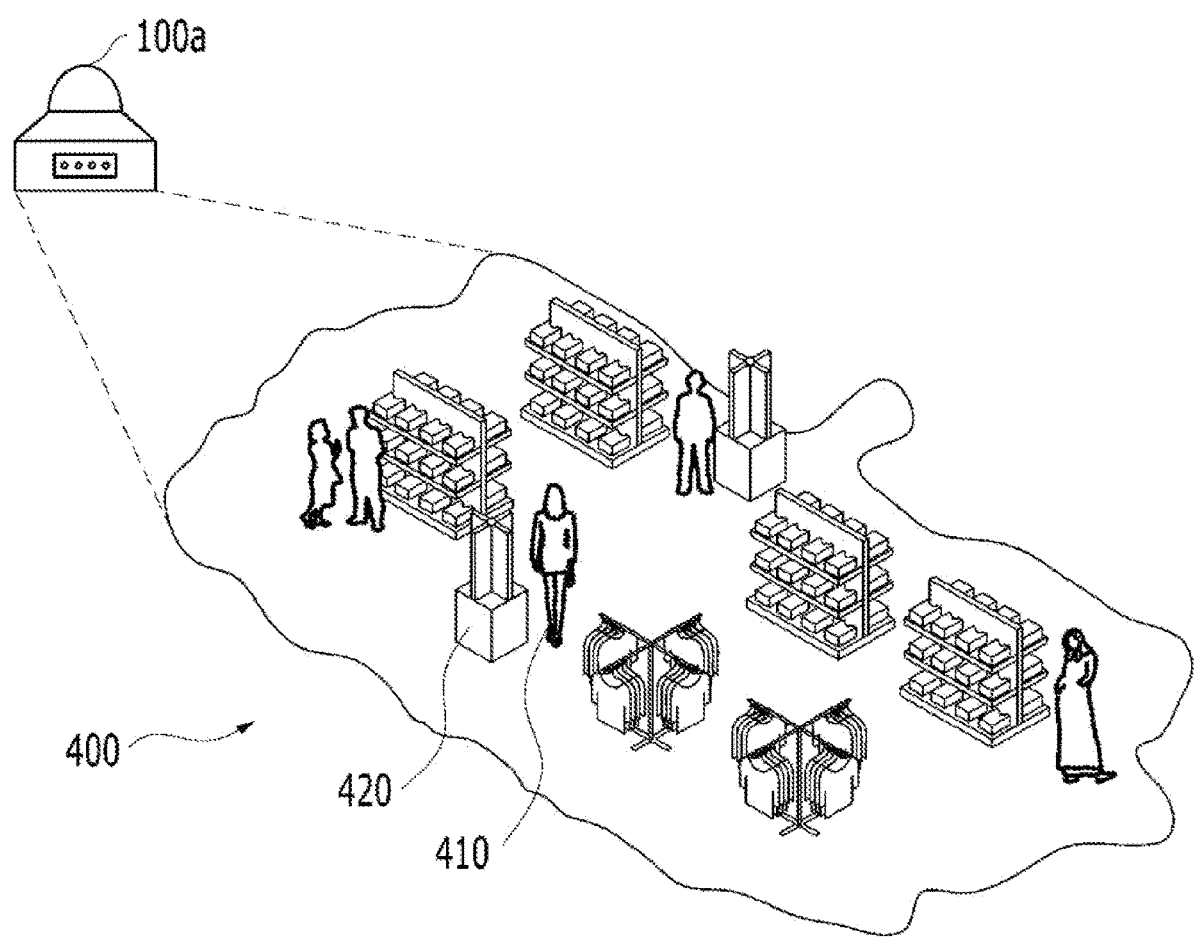
FIG. 7 is a drawing illustrating an example of a surveillance area captured by the surveillance camera device according to an embodiment.

FIG. 7 is a drawing illustrating an example of a surveillance area captured by the surveillance camera device according to an embodiment.

Referring to FIG. 7, the surveillance camera device according to an embodiment may be configured to monitor a clothing store as illustrated. In FIG. 7, at least one surveillance camera device 100*a* monitors as a surveillance area 400 the clothing store where many consumers 410 shop for clothes on various display stands 420. To this end, the surveillance camera device 100*a* may include a dome-shaped camera 110 and a microphone array 120 including a plurality of microphones 120*a* as illustrated in FIG. 6.

The surveillance camera device may be installed at a fixed position to perform an operation of continuously receiving video signals and audio signals of the surveillance area 400, and these signals can be provided to the processor 130 of the surveillance server 150.

The video signals and audio signals of the surveillance area 400 received from the surveillance camera device 100*a* may be accumulated and stored in the database 142 and/or the memory 140 of the surveillance server 150. This accumulated information may indicate in which specific area in the surveillance area 400 more consumers 410 are detected, or more voice signals are detected.

According to an embodiment, the data collector 134 of the processor 130 may generate a sound-based heatmap based on the accumulated information stored in the database 142 and/or the memory 140, that is, data corresponding to the video signals and audio signals of the surveillance area 400 received the surveillance camera device 100*a* and accumulated in the surveillance server 150. As mentioned earlier, the data may correspond to the information about the surveillance area received and accumulated through the surveillance camera device 100*a* which is set up at a fixed position. Additionally, the information about the surveillance area may include information such as the material, the size and the position of an obstacle, for example, a display stand 420 set up in the surveillance area 400.

According to an embodiment, the sound-based heatmap may display a position of a pitch range of interest (e.g., a human voice signal band) together with video data input from the camera 110 by sound source localization based on the audio signal input from the microphone array 120 of the surveillance camera device 100*a*.

According to an embodiment an audio signal to be amplified may be limited to a human voice signal, when a user intends to amplify the audio signal of the specific area in the surveillance area, which is input from the microphone array 120 of the surveillance camera device 100*a*. Thus, it is possible to limit the human voice signal to the target of the beam-forming and correct a specific position of a user-designated area in order to receive the voice signal precisely.

According to an embodiment, an audio signal to be a target of beam-forming is a human voice signal because a sound or audio a user wishes to clearly hear may be a language generally spoken by a human. Thus, it is necessary to determine whether a received audio signal includes human language information, specifically, to detect whether the received audio signal includes at least one "vowel" which is commonly generated from the human intraoral structure. A human voice includes syllables irrespective of the language the human speaks and each syllable includes at least one vowel. These vowels are commonly contained in various languages.

Accordingly, it is possible to identify or check whether the received audio signal is a human voice signal by determining whether the audio signal input from the microphone array 120 of the surveillance camera device 100*a* includes at least one "vowel". In other words, a human language includes syllables each of which includes at least one "vowel", and each vowel has frequency characteristics distinct from each other as illustrated in graphs illustrated in FIGS. 8A-8C.

Figure 8A:
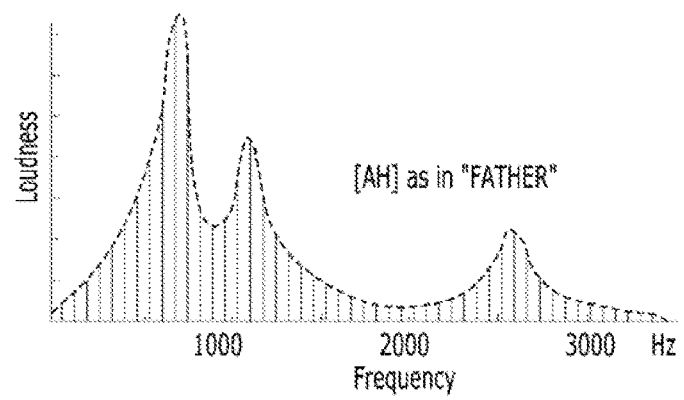
FIGS. 8A to 8C illustrate graphs showing a standard to determine whether the collected sound source signal includes the human language information, each graph indicating the frequency and the loudness generated from vowels included in specific words spoken by a human.
Figure 8B:
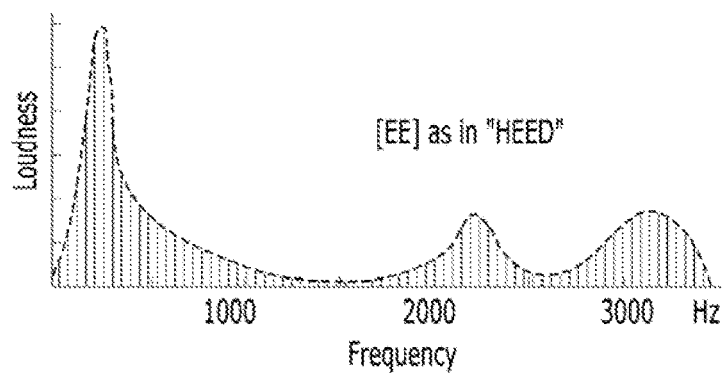
Figure 8C:
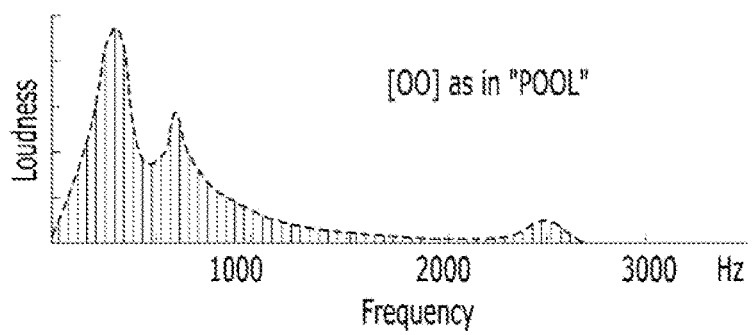

FIGS. 8A-8C illustrate graphs showing a reference to determine whether a received audio signal includes human language information. Each graph indicates a frequency (Hz) and a size (loudness) generated from vowels included in a specific word spoken by a human. To this end, the size (loudness) shown in the y-axis of the graph may indicate a relative size of a sound.

The graph in FIG. 8A illustrates frequency characteristics generated from the vowels included in a word "FATHER", in particular, when a human says "AH". That is, according to the graph in FIG. 8A, it is shown that the voice signal includes the first signal having a size of 7 at about 700 Hz, the second signal having a size of 4 at about 1200 Hz and the third signal having a size of about 2 at about 2600 Hz, when a human says "AH".

Additionally, the graph in FIG. 8B illustrates frequency characteristics generated from the vowels included in a word "HEED", in particular, when a human says "EE". That is, according to the graph in FIG. 8B, it is shown that the voice signal includes the first signal having a size of 6 at about 300 Hz, the second signal having a size of 2 at about 2300 Hz and the third signal having a size of about 2 at about 3200 Hz, when a human says "EE".

Further, the graph in FIG. 8C illustrates frequency characteristics generated from the vowels included in a word "POOL", in particular, when a human says "OO". That is, according to the graph in FIG. 8C, it is shown that the voice signal includes the first signal having a size of 5 at about 300 Hz, the second signal having a size of 3 at about 700 Hz and the third signal having a size of about 1 at about 2500 Hz, when a human says "OO".

According to an embodiment, the audio signals input through the microphone array 120 of the surveillance camera device 100a may be accumulated and stored in the database 142 and/or the memory 140.

According to an embodiment, it is possible to determine whether an audio signal includes the vowel characteristics (e.g., frequencies and/or sizes) as illustrated in FIGS. 8A-8C by performing a frequency analysis on the input audio signals. As a result, it may be determined whether the received audio signal is a human voice signal based on the determination of whether the input audio signal includes at least one "vowel".

Additionally, the horizontal viewing angle and the vertical viewing angle of the camera 110 in the surveillance camera device 100a can be determined on the basis of the center of the lens. The viewing angle refers to an angle viewable to a user from the center of an image up to the edges of the image.

Figure 9:
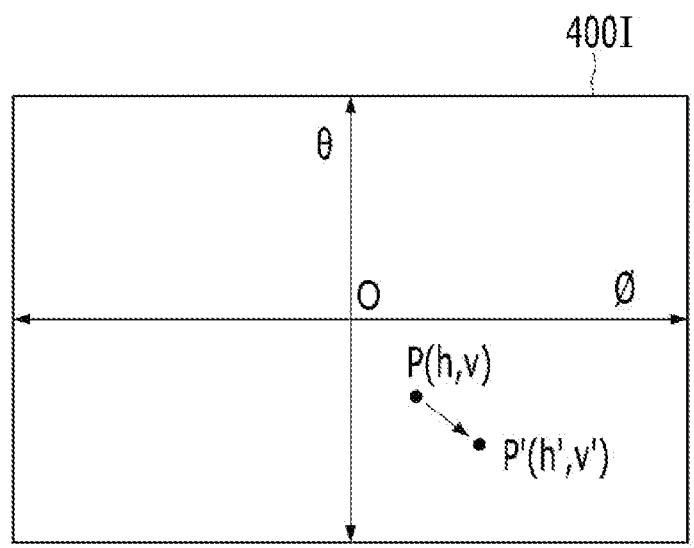
FIG. 9 is a drawing showing a view angle of the surveillance area video captured by the surveillance camera system according to an example embodiment.

FIG. 9 is a drawing showing a viewing angle of a surveillance area image captured by a surveillance camera system according to an embodiment. Referring to FIG. 9, a surveillance area image 4001 captured by a camera has a horizontal viewing angle Φ and a vertical viewing angle θ. Here, it is intended to amplify a sound of an area positioned at a point P (h, v) designated by the user setter 132. Here, the surveillance area image 4001 may be a video image of the surveillance area 400 shown in FIG. 7 captured by the surveillance camera device 100a.

Here, the camera may be implemented by a surveillance camera and the surveillance area image 4001 may be a video image of a same area captured for a long time.

A vector passing through, for example, between the origin O and the point P designated by a user in the surveillance area image 4001 can be obtained because the positions focused on from the center of the camera 110 are connected linearly due to the straightness of light.

Additionally, the sound propagating in a spherical waveform can be approximated to be a plane at a long distance. Thus, it is possible to obtain a delay time of each microphone of the microphone array 120a for a beam-forming based on a plane equation having the vector as a normal vector.

The camera 110 of the surveillance camera device 100a can detect the surveillance area image 4001 illustrated in FIG. 9 according to the viewing angle information. Thus, it is possible to detect a user-designated area in the surveillance area image 4001, for example, the area corresponding to the point P in FIG. 9.

The microphone array 120 of the surveillance camera device 100a detects a sound wave of a sound source, and generates an electrical signal corresponding to the sound wave. The electrical signal may be defined by an audio signal. The intervals between the microphones of the microphone array 120 and position information thereof may be stored in the memory 140 in advance to be used for beam-forming of the sound source.

The processor 130 is configured to output the sound from the surveillance area using a beam-forming technique. In particular, it performs an operation to amplify through the user area selector 132 the sound of the user-designated area in the surveillance area image 4001 illustrated in FIG. 9, for example, the sound of the area corresponding to the point P in FIG. 9.

The user area selector 132 performs an operation to designate an area on which the user wants to perform a beam-forming in the surveillance area image 4001. Subsequently, the processor 130 performs an operation to select an optimal point used to obtain a directional vector in the designated area. According to an embodiment, it is characterized by limiting the target of the beam-forming to the human voice signal. Additionally, according to an embodiment, as mentioned earlier, it is possible to perform a frequency analysis on the input audio signal and verify that the audio signal includes the vowel characteristics (e.g., a frequency and a size) as shown in FIGS. 8A-8C in order to determine whether the audio signal is the human voice signal.

In other words, it is possible to perform beam-forming on and amplify the sound of an area, corresponding to the point P, designated through the user area selector 132, that is, the sound including the human language information. In addition, it is possible to receive and accumulate information about the position corresponding to the sound using a sound source localization based on the sound-based heatmap, and compensate the optimal point of the user-designated area based on the accumulated information. Here, the surveillance area image 4001 of the fixed area is captured through the surveillance camera device 100a set up at a fixed position and is used as a target of the sound source localization. Referring to FIG. 9, according to an embodiment, P(h, v) initially selected in the user-designated area can be corrected into P'(h', v') through the compensation operation.

Hereinafter, operations of the processor 130 in the surveillance server 130 will be described in more detail with reference to FIGS. 10 and 11.

Figure 10:
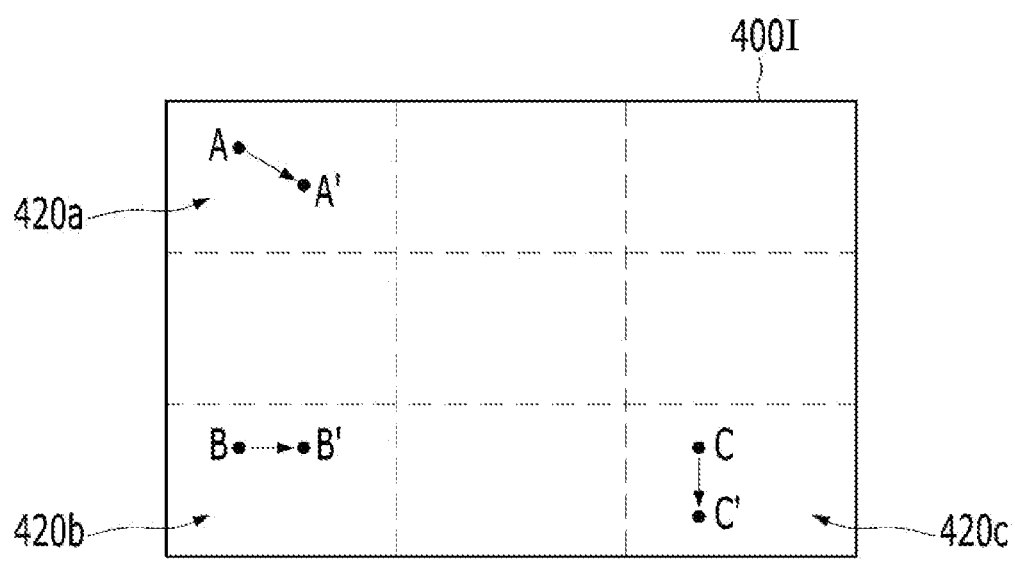
FIG. 10 is a drawing illustrating an example of a video image corresponding to a surveillance area of a surveillance camera system according to an embodiment.
Figure 11:
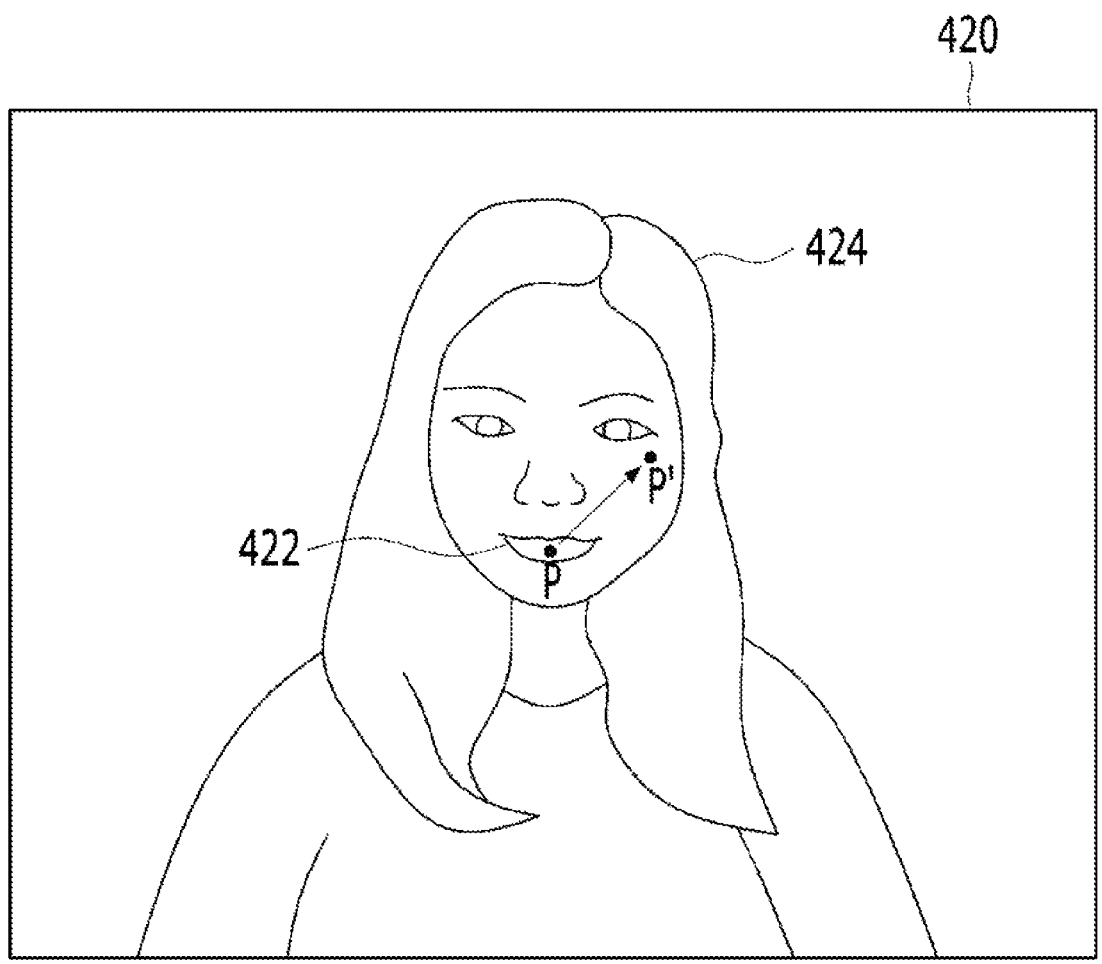
FIG. 11 is a drawing showing that a position to perform an audio zooming on in a specific area selected as the user-designated area is corrected in the surveillance area.

FIG. 10 is a drawing illustrating an example of a video image corresponding to a surveillance area of a surveillance camera system according to an embodiment, and FIG. 11 is a drawing showing that a position to perform an audio zooming in a specific area selected as the user-designated area is corrected in the surveillance area.

Referring to FIG. 10, a surveillance area image 4001 is split into a plurality of areas, and thus, the user area selector 132 of the processor 130 may select at least one of the plurality of areas. For example, the user area selector 132 may designate a first split area 420a as a user area in order to amplify, that is, perform an audio zooming on a voice signal generated in a position A of FIG. 10. Here, the surveillance area image 4001 shown in FIG. 10 may be a video image of the surveillance area 400 shown in FIG. 7 captured by the surveillance camera device 100*a*.

Additionally, the user area selector 132 may designate a second split area 420*b* as another user area in order to amplify, that is, perform an audio zooming on a voice signal generated in a position B of FIG. 10.

Likewise, the user area selector 132 may designate a third split area 420*c* as still another user area in order to amplify, that is, perform an audio zooming on a voice signal generated in a position C of FIG. 10.

According to an embodiment, it is possible to designate as a user area at least one split area among the above three split areas, then receive and accumulate information on a position corresponding to a sound source using a sound source localization based on the sound-based heatmap, and compensate the optimal point of the user-designated area using the accumulated information. That is, the audio zooming point A of the first split area 420*a* can be corrected as position A', the audio zooming point B of the second split area 420*b* can be corrected as position B', and the audio zooming point C of the third split area 420*c* can be corrected as position C'.

FIG. 11 is a more specific example which shows that audio zooming is performed on a specific area selected as a user-designate area, that is, the audio zooming point is corrected from a position P to a position P'.

Referring to FIG. 11, a split area 420 corresponding to a specific speaker 424 in a surveillance area image of the surveillance camera device 100*a*, may be designated by the user area selector 132 of the processor 130. Here, the split area 420 may be one of the plurality of split areas of the surveillance area image 4001 shown in FIG. 10.

To this end, the user area selector 132 may specify precisely an object to be a target of beam-forming and audio zooming by using a motion detection algorithm and a face recognition algorithm.

According to an embodiment of FIG. 11, it is possible to identify and check who the speaker 424 displayed in the selected split area 420 is, based on the face recognition algorithm, and designate a speaker's mouth 422 as an audio zooming point P to perform beam-forming on an audio signal generated by the speaker 424, that is, a voice signal.

However, according to an embodiment, the position P can be corrected to the position P' for precise audio zooming, for example, by using a sound-based heatmap generated by the data collector 134 of the processor 130.

Here, video signals and audio signals of the surveillance area 400 received from the surveillance camera device 100*a* may be accumulated and stored, as corresponding data, in the database 142 and/or the memory 140 of the surveillance server 150. These accumulated data may provide information about an area in the surveillance area 400 where more consumers are detected and/or more voice signals of consumers are detected.

The data collector 134 of the processor 130 can generate a sound-based heatmap based on the data accumulated and stored in the database 142 and/or the memory 140, that is, by using the data corresponding to video signals and audio signals of the surveillance area 400 received from the surveillance camera device 100*a*. In other words, as mentioned earlier, the data may be corresponding to information about the surveillance area 400 received by the surveillance camera device 100*a* set up at a fixed position. Additionally, the information about the surveillance area may include information such as the material, the size and the position of an obstacle, for example, the display stand 420 set up in the surveillance area 400 (see FIG. 7).

According to an embodiment, the sound-based heatmap may display a position of a pitch range of interest (e.g., a human voice signal band) together with video data input from the camera 110 by a sound source localization based on the audio signal input from the microphone array 120 of the surveillance camera device 100*a*. Additionally, the data collector 134 of the processor 130 may perform an operation to limit an audio signal to be amplified to a human voice signal, when a user intends to amplify the audio signal of a specific position (audio zooming point) in the surveillance area 400. That is, the target of the beam-forming may be limited to the human voice signal. The calculator 136 of the processor 130 may obtain an optimal point of the audio zooming point in the area designated by the user area selector 132, based on information related to the audio zooming point selected in a two dimensional image through the viewing angle of the camera 110 of the surveillance camera device 100*a*, that is, the viewing angle of the camera lens, and information related to the audio zooming point output by the data collector 134.

More particularly, the calculator 136 may perform calculation for compensating distortion phenomena of a propagating sound. Sound propagation can be distorted due to various factors such as temperature, surrounding obstacles, etc. Information such as various obstacle surroundings (e.g., the display stand 420 in FIG. 7) lying in the surveillance area 400 may be stored in the database 142 and/or the memory 140, and the sound-based heatmap may be generated based on this information. This distortion may not be calculated mathematically, so a customization process adapted to each situation is needed in order to compensate for the distortion precisely.

According to an embodiment, the calculator 136 may perform the customization process by selecting an arbitrary point on the basis of the sound-based heatmap input from the data collector 134, analyzing the selected points together with the surrounding sounds, and obtaining the compensation value for the distortion. That is, as illustrated in FIG. 11, in case that an area initially selected as the audio zooming point is the point P corresponding to the mouth 422 of the speaker 424, the calculator 136 may perform an audio zooming on the sound input from surrounding coordinates of the selected audio zooming point P, compare the quality of the received sound data with the point P, and designate better coordinates as the corrected audio zooming point P'

According to an embodiment, a user may directly select the corrected audio zooming point on a screen that displays the correct audio zooming point P' as illustrated in FIG. 11. Additionally, according to an embodiment, the user may select one among a plurality of correct audio zooming points P' on the screen that displays the plurality of correct audio zooming points P'.

The compensator 138 may perform an operation to modify the direction of the optimal point obtained by the calculator 136 to a reference direction of the microphone array 120. More particularly, the compensator 138 may modify coordinates of the audio zooming point P in the specific split area 420 designated by the user area selector 132 to the corrected second audio zooming point P', and perform sound reception in the beam direction of the aperture of the microphone array 120.

Figure 12:
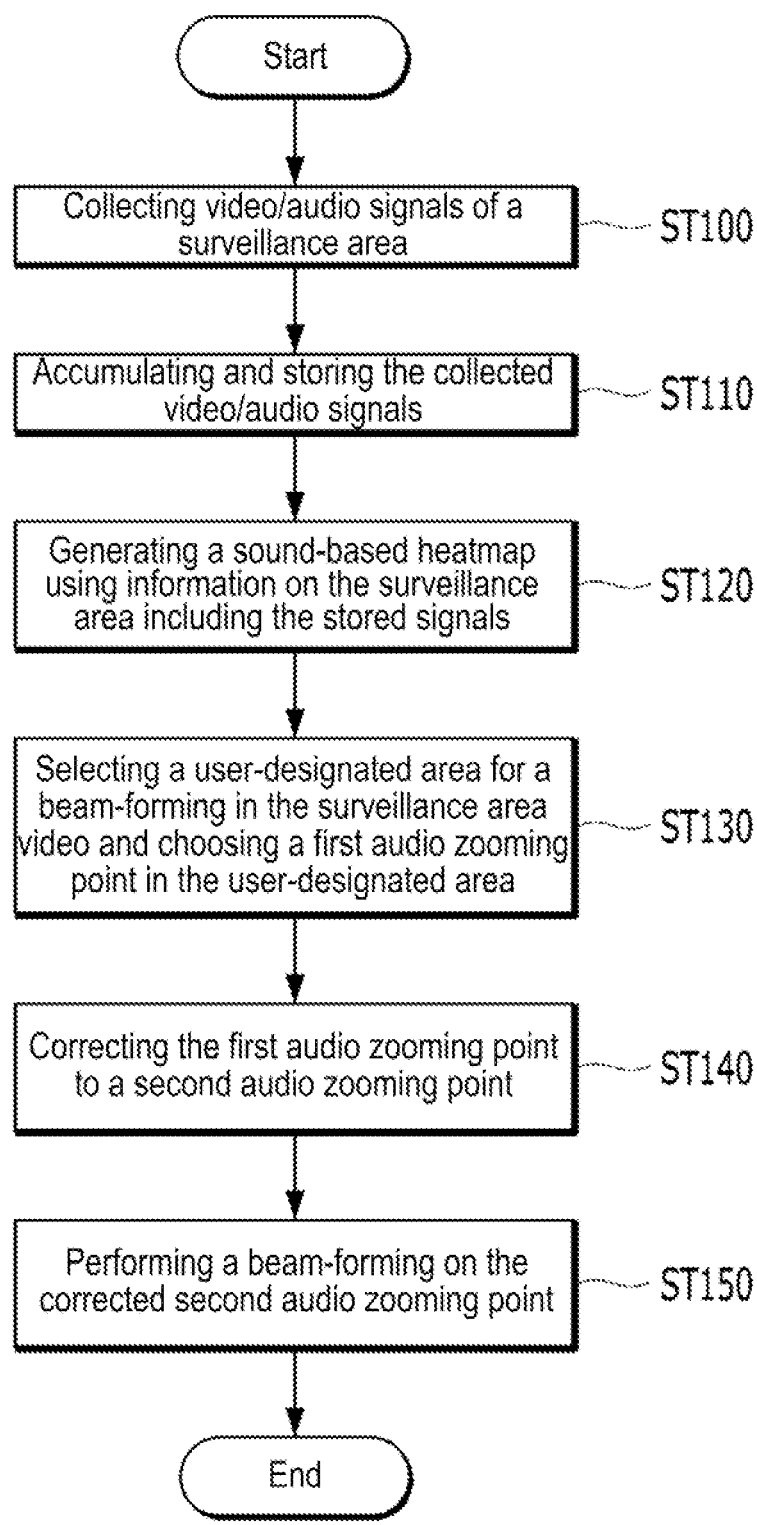
FIG. 12 is a flow chart illustrating a method for operating the surveillance camera system according to an embodiment.

FIG. 12 is a flow chart illustrating a method for operating the surveillance camera system in reference to FIGS. 1-11, according to an embodiment.

First, the surveillance camera device 100*a* which is installed at a fixed position performs an operation to continuously receive video signals and audio signals of the surveillance area 400 which are provided to the processor 130 of the surveillance server 150 (ST 100).

Next, the video signals and audio signals of the surveillance area 400 received in the surveillance camera device 100a are accumulated and stored in the database 142 and/or the memory 140 of the surveillance server 150 (ST 110).

Additionally, the processor 130 of the surveillance server 150, that is, the data collector 134 included therein generates a sound-based heatmap using information accumulated and stored in the database 142 and/or the memory 140, that is, data corresponding to the video signals and the audio signals of the surveillance area 400 received and accumulated from the surveillance camera device 100a (ST 120).

The sound-based heatmap displays the position of a pitch range of interest (e.g., a human voice signal band) together with video data input from the camera 110 by a sound source localization based on the audio signal input through the microphone array 120 of the surveillance camera device 100a. According to an embodiment, the audio signal to be amplified is limited to a human voice signal, when the user intends to amplify the audio signal of a specific area in the surveillance area 400.

According to an embodiment, it is possible to verify that the audio signal is the human voice signal by determining whether the audio signal input from the microphone array 120 of the surveillance camera device 100a includes a "vowel".

For example, it is possible to determine whether the audio signal includes vowel characteristics (e.g., a frequency and a size characteristic) as illustrated in FIGS. 8A-8C by performing a frequency analysis on the input audio signal. That is, we can verify whether the received audio signal is the human voice signal by determining whether the input audio signal includes a "vowel".

Next, a specific area is selected as a user-designated area to perform a beam-forming thereon within the surveillance area video 4001 of the surveillance camera device 100a, and a first audio zooming point is selected in the user-designated area (ST 130).

Referring to FIG. 11, the user may select the split area 420 corresponding to the area where the specific speaker 424 is disposed. To this end, the user area selector 132 may precisely specify an object to be a target of the beam-forming and audio zooming using a motion detection algorithm and a face recognition algorithm.

Additionally, the user can designate the first audio zooming point in the user-designated area. In particular, the user can designate the speaker's mouth 422 as the first audio zooming point P for the beam-forming on the audio signal generated by the speaker 424, that is, the voice signal.

Next, the first audio zooming point in the user-designated area is corrected to the second audio zooming point on the basis of information on the detected area stored in the database and/or the memory (ST 140).

For example, the calculator 136 of the processor 130 may correct the first audio zooming point P in the user-designated area to the second audio zooming point P', based on information related to the viewing angle of the camera 110 of the surveillance camera device 100a, that is, information related to the audio zooming point selected in the two dimensional image through the viewing angle of the camera 110, and information related to the first audio zooming point output by the data collector 134.

More particularly, the calculator 136 may obtain a compensation value for distortion, by analyzing the first audio zooming point P selected on the basis of the sound-based heatmap together with surrounding sounds. That is, referring to FIG. 11 in which the area initially selected as the first audio zooming point corresponds to the point P at the mouth 422 of the speaker 424, the calculator 136 may perform an audio zooming on the sound input from surrounding coordinates of the selected first audio zooming point P, compare the quality of the received sound data with the point P, and designate better coordinates as the corrected second audio zooming point P'.

Finally, an operation is performed to set the second audio zooming point direction as a reference direction of the microphone array 120 in the surveillance camera device 100a based on the corrected second audio zooming point. That is, a beam-forming is performed on the corrected second audio zooming point (ST 150).

For example, the compensator 138 of the processor may change the optimal point obtained by the calculator 136 to the reference direction of the microphone array 120. More particularly, the compensator 138 of the processor may change coordinates of the first audio zooming point P in the specific split area 420 designated by the user area selector 132 to the corrected second audio zooming point P', and perform a sound reception in the beam direction of the aperture of the microphone array 120.

According to the above embodiments, in a surveillance camera system having a camera and a microphone array on different surfaces, it is possible to receive a video signal and an audio signal respectively using the camera and the microphone array, and amplify the audio signal corresponding to the audio zooming point in the user-designated area based on the received signal.

Additionally, it is possible to perform a precise audio zooming by correcting the selected audio zooming position and receiving the human voice signal, with reference to the database storing the input signals and various information corresponding to the surveillance area of the camera.

At least one of the components, elements, modules or units described herein, for example, the components included in the processor 130 as shown in FIG. 5, may be embodied as various numbers of hardware, software and/or firmware structures that execute respective functions described above, according to an embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above embodiments may be implemented in algorithms that execute on one or more processors. Furthermore, the components, elements or units represented by a block or processing operations may employ any number of related art techniques for electronics configuration, signal processing and/or control, data processing and the like.

The disclosure has been described herein with regard to embodiments. However, it will be obvious to those skilled in the art that various modifications may be made without departing from the gist of the disclosure. Therefore, it is to be understood that the scope of the disclosure is not limited to the above-mentioned embodiments but is intended to include various modifications and equivalents included within the spirit and scope of the appended claims.

What is claimed is:

1. A camera system for extracting sounds of a specific area, comprising:
   a camera device configured to receive video signals and audio signals from an area;
   at least one memory configured to store information about the area including data corresponding to the video signals and the audio signals from the area; and
   a processor configured to change an audio zooming point of the camera device from a first point, in an image of the area captured by the camera device, to a second point based on the information about the area, and perform a beam-forming on an audio signal corresponding to the second point,
   wherein the processor is configured to implement:
   a data collector configured to generate a sound-based heatmap for the area based on the information about the area;
   a user area selector configured to select a user-designated area to perform the beam-forming thereon, and select the first point in the user-designated area as the audio zooming point;
   a calculator configured to select the second point as the audio zooming point in the user-designated area, based on the first point and the sound-based heatmap; and
   a corrector configured to perform the beam-forming in a direction corresponding to the second point.

2. The system of claim 1, wherein the audio signal on which the beam-forming is performed is limited to a human voice signal.

3. The system of claim 2, wherein the processor is further configured to determine the audio signal as the human voice signal based on determining that the audio signal includes a vowel among language components.

4. The system of claim 1, wherein the sound-based heatmap displays positions of a pitch range corresponding to human voice signals by a sound source localization based on the video signals and the audio signals received by the camera device.

5. The system of claim 1, wherein the area is split into a plurality of areas, and the user area selector is configured to select at least one of the plurality of areas as the user-designated area.

6. The system of claim 5, wherein the user area selector is configured to specify an object corresponding to a target of the beam-forming based on a motion detection algorithm and/or a face recognition algorithm.

7. The system of claim 1, wherein both the first and second points are displayed on the image of the area.

8. The system of claim 7, wherein the second point is selected from a plurality of second points displayed by the camera device.

9. The system of claim 1, wherein the camera device comprises:
   a camera configured to collect the video signals having a specific viewing angle; and
   a microphone array comprising a plurality of microphones spaced apart from one another, and configured to collect the audio signals.

10. The system of claim 9, wherein the camera and the microphone array are disposed on different surfaces of the camera device.

11. The system of claim 1, wherein the memory is further configured to manage data output from the calculator, and store a measurement time and a date corresponding the video signals and the audio signals received by the camera device together with the data output from the calculator.

12. A method for operating a camera system for extracting sounds of a specific area, the method comprising:
   receiving video signals and audio signals from an area;
   storing information about the area including the video signals and the audio signals;
   generating a sound-based heatmap for the area based on the information about the area;
   selecting a user-designated area to perform beam-forming thereon and selecting a first point in the user-designated area as an audio zooming point;
   changing the audio zooming point to a second point in the user-designated area based on the first point and the sound-based heatmap; and
   performing the beam-forming in a direction corresponding to the second point.

13. The method of claim 12, wherein an audio signal on which the beam-forming is performed is limited to a human voice signal.

14. The method of claim 13, further comprising:
   determining the audio signal as the human voice signal based on determining that the audio signal includes a vowel among language components.

15. The method of claim 12, wherein the sound-based heatmap displays positions of a pitch range corresponding to human voice signals by a sound source localization based on the video signals and the audio signals.

16. The method of claim 12, wherein the area is split into a plurality of areas, and the selecting the user-designated area comprises selecting at least one of the plurality of split areas as the user-designated area.

17. The method of claim 16, wherein the selecting the user-designated area further comprises:
   specifying an object corresponding to a target of the beam-forming based on a motion detection algorithm and/or a face recognition algorithm.

18. The method of claim 12, wherein both the first and second audio zooming points are displayed on an image of the area.

19. The method of claim 18, wherein the second point is selected from a plurality of second points displayed by a camera device.

* * * * *